(12) United States Patent
Allen

(10) Patent No.: US 10,581,229 B2
(45) Date of Patent: Mar. 3, 2020

(54) CONDUIT SPACE RECOVERY SYSTEM

(71) Applicant: WESCO Distribution, Inc., Pittsburgh, PA (US)

(72) Inventor: Jerry L. Allen, Sarasota, FL (US)

(73) Assignee: WESCO DISTRIBUTION INC., Pittsburgh, PA (US)

( * ) Notice: Subject to any disclaimer, the term of this patent is extended or adjusted under 35 U.S.C. 154(b) by 215 days.

(21) Appl. No.: 15/187,166

(22) Filed: Jun. 20, 2016

(65) Prior Publication Data

US 2016/0308337 A1 Oct. 20, 2016

Related U.S. Application Data

(62) Division of application No. 13/622,173, filed on Sep. 18, 2012, now Pat. No. 9,391,433.

(60) Provisional application No. 61/562,035, filed on Nov. 21, 2011.

(51) Int. Cl.

| | |
|---|---|
| *H02G 1/12* | (2006.01) |
| *H02G 9/06* | (2006.01) |
| *B26D 7/18* | (2006.01) |
| *H02G 3/04* | (2006.01) |
| *B26D 3/00* | (2006.01) |
| *B26D 7/06* | (2006.01) |
| *H02G 1/08* | (2006.01) |

(52) U.S. Cl.
CPC ............ *H02G 1/126* (2013.01); *B26D 3/001* (2013.01); *B26D 7/06* (2013.01); *B26D 7/0683* (2013.01); *B26D 7/1836* (2013.01); *H02G 1/08* (2013.01); *H02G 1/1297* (2013.01); *H02G 3/0487* (2013.01); *H02G 9/06* (2013.01); *H02G 9/065* (2013.01); *Y10T 83/0467* (2015.04); *Y10T 83/2092* (2015.04); *Y10T 83/2181* (2015.04); *Y10T 83/2209* (2015.04)

(58) Field of Classification Search
CPC ...... G02B 6/4479; G02B 6/4495; H02G 1/08; H02G 1/1297; H02G 3/0487; H02G 1/126; B26D 7/0683; B26D 3/001
USPC ..... 83/27, 13, 109, 746, 613, 523, 697, 885, 83/873, 874, 425.2, 107, 433, 872, 879, 83/880, 886; 30/0.4, 90.1, 90.8, 90.4, 30/91.1, 91.2; 29/403.3, 825
See application file for complete search history.

(56) References Cited

U.S. PATENT DOCUMENTS

| | | | | |
|---|---|---|---|---|
| 3,339,437 | A | * | 9/1967 | Hamilton ............. H02G 1/1248 81/9.51 |
| 3,817,132 | A | * | 6/1974 | Emery ................. H01B 15/005 81/9.51 |
| 4,685,831 | A | * | 8/1987 | Mahoney ................. H02G 1/08 254/134.3 SC |

(Continued)

OTHER PUBLICATIONS

Petro Comm Industries Ltd. (Advertisement 2003—2 pages).

(Continued)

*Primary Examiner* — Ghassem Alie
(74) *Attorney, Agent, or Firm* — Renner, Kenner, Greive, Bobak, Taylor & Weber

(57) ABSTRACT

Space in a conduit having at least one cable therein which is surrounded by a duct is recovered by longitudinally cutting the duct and removing the duct from around the cable. The duct may be pulled out of the conduit and past a blade to affect the cutting, or a blade may be pulled through the conduit to cut the duct while still in the conduit.

15 Claims, 5 Drawing Sheets

(56) References Cited

U.S. PATENT DOCUMENTS

| | | | | |
|---|---|---|---|---|
| 4,688,890 | A * | 8/1987 | DeMeo | G02B 6/4463 |
| | | | | 138/108 |
| 6,276,250 | B1 * | 8/2001 | Ayling | F16L 1/06 |
| | | | | 29/403.3 |
| 6,845,789 | B2 | 1/2005 | Field | |
| 7,188,642 | B2 * | 3/2007 | James | G02B 6/4459 |
| | | | | 139/383 R |
| 7,991,256 | B2 * | 8/2011 | Griffioen | G02B 6/4496 |
| | | | | 385/109 |
| 2002/0081083 | A1 * | 6/2002 | Griffioen | G02B 6/4464 |
| | | | | 385/109 |

OTHER PUBLICATIONS

Condux International, Inc. (Advertisement 2010—2 pages).
General Machine Products Co., Inc. (Advertisement 2010—1 page).
General Machine Products Co., Inc. (Press Release 2009—3 pages).

* cited by examiner

CONDUIT SPACE RECOVERY SYSTEM

CROSS-REFERENCE TO RELATED APPLICATION

This application is a division of U.S. patent application Ser. No. 13/622,173 filed on Sep. 18, 2012, which claimed priority benefit from U.S. Provisional Patent Application Ser. No. 61/562,035 filed Nov. 21, 2011, both of which are incorporated herein by reference in its entirety.

TECHNICAL FIELD

This invention relates to conduits which house communications cables within innerducts in the conduits. More specifically, this invention relates to a system for removing the innerducts from around live cables so as to recover space in the conduits which can then be used to receive one or more additional cables.

BACKGROUND ART

It is likely that there are currently millions of miles of conduits buried under ground, which conduits carry one or more communications cables. Typically these cables are housed in plastic innerducts positioned in the conduit. The purpose of these innerducts is to protect a cable when an additional cable might be installed in the same conduit. In addition, it is easier to install the additional cables if they too are in separate innerducts.

There comes a time, however, when the conduit is essentially filled with innerducts and no more cables can be installed therein. Such a situation is shown in FIG. 1A where a conduit 10 is filled with innerducts 11, each of which are carrying a live or active cable 12. These innerducts cannot readily be removed because, to date, the only known way to do so would be to sever a cable, which cannot be done if it is an active cable. As such, if additional communications cables are needed in that geographical area, a new conduit must be buried in the ground which is a very labor intensive, time-consuming, and expensive project.

Thus, the need exists to recover the space in a conduit which is being taken up by one or more innerducts so that additional cables can be installed in the existing conduit.

DISCLOSURE OF THE INVENTION

It is thus an object of one aspect of the present invention to provide a system of recovery space in a conduit by cutting and removing from the conduit an innerduct which houses a live cable.

It is an object of another aspect of the present invention to provide a system, as above, wherein the innerduct is cut while it is being removed from the conduit.

It is an object of an additional aspect of the present invention to provide a system, as above, wherein the innerduct is cut while still in the conduit and thereafter removed.

These and other objects of the present invention, as well as the advantages thereof over existing prior art forms, which will become apparent from the description to follow, are accomplished by the improvements hereinafter described and claimed.

In general, in accordance with one aspect of the present invention, a method of recovering space in a longitudinally extending conduit having at least one cable surrounded by a longitudinally extending duct in the conduit includes the steps of longitudinally cutting the duct and removing the duct from around the cable.

In accordance with another aspect of the present invention, a method of recovering space in a longitudinally extending conduit having at least one cable surrounded by a longitudinally extending duct in the conduit includes the steps of moving the duct out of the conduit and, as the duct is being moved, cutting the duct so that is may be removed from around the cable.

Another aspect of the present invention involves a method of recovering space in a longitudinally extending conduit having at least one cable surrounded by a longitudinally extending duct in the conduit which includes the steps of accessing the conduit and the duct in a manhole and pulling the duct a short distance into the manhole. The duct is then engaged and moved toward a blade assembly which cuts the duct longitudinally into at least two pieces which are then removed from around the cable.

One form of apparatus for cutting a duct which surrounds a cable in a longitudinally extending duct includes a drive assembly is adapted to engage the duct and pull the duct out of the conduit. A cutting assembly is carried by each arm to longitudinally cut the duct. A cutting assembly is positioned to longitudinally cut the duct as it is being pulled by the drive assembly.

Preferred exemplary systems for recovering space in a conduit according to the concepts of the present invention are shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1A:
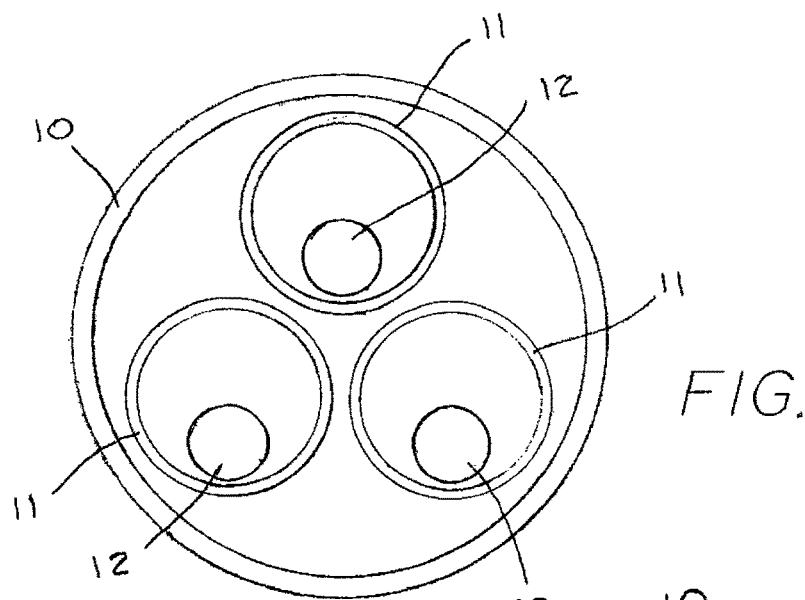
FIG. 1A is a schematic and end view of a conduit which is filled with three innerducts, each of which is housing a communications cable.

A conduit 10 for carrying communications cables 12 typically will extend longitudinally in the ground for up to thousands of feet. As previously described, when multiple cables are to be positioned in a conduit, it is easier to insert them and to keep them from damaging existing cable or being twisted with existing cable by inserting them into some kind of duct, commonly known as an innerduct, such as the plastic tubing innerduct 11 shown. However, as shown in FIG. 1A, these innerducts 11 take up space that could otherwise be used for additional cables 12.

Figure 1B:
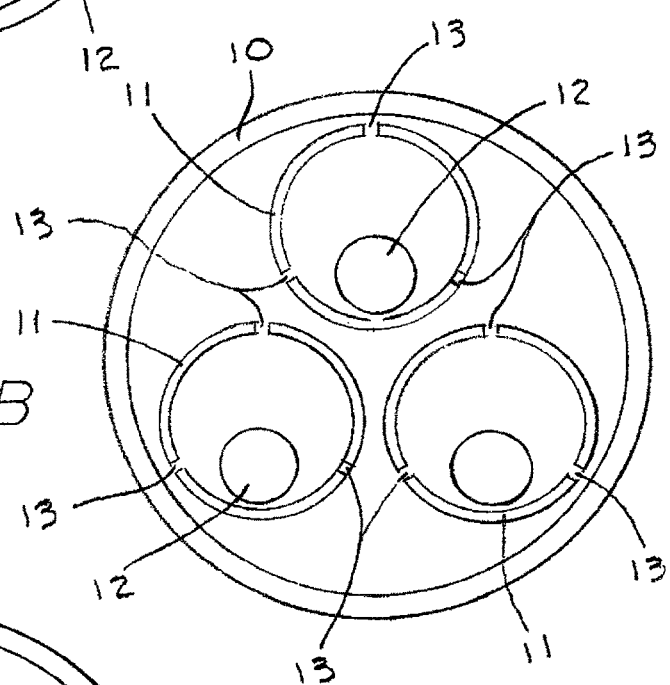
FIG. 1B is a schematic view, like FIG. 1, showing that the innerducts have been slit lengthwise.
Figure 1C:
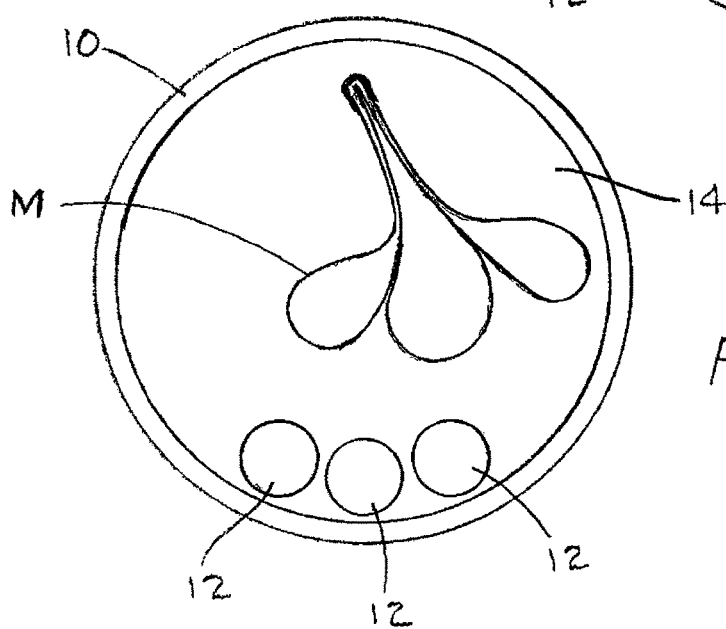
FIG. 1C is a schematic view, like FIGS. 1 and 2, showing the space in the conduit that is recovered after the split innerducts have been removed.

In accordance with the present invention, as shown in FIG. 1B, one or more of the innerducts 11 may be cut along their length, as at 13, at multiple locations. Then the pieces of innerduct 11 may be removed from around the cables 12 which creates a recovered space 14 in the conduit 10 as shown in FIG. 1C. Then it would be preferable to encase the freed cable or cables 12 in a fabric sleeve so that additional cables could be inserted into conduit 10 without encountering the friction caused by an exposed cable and without potentially damaging existing cable. In addition, a fabric innerduct M, such as that shown in U.S. Pat. No. 6,251,201, and sold under the trademark MAXCELL® by Wesco Distribution, Inc. of Pittsburgh, Pa., could be inserted into space 14 and new cables could be inserted of inside the compartments of the fabric innerduct.

Figure 2:
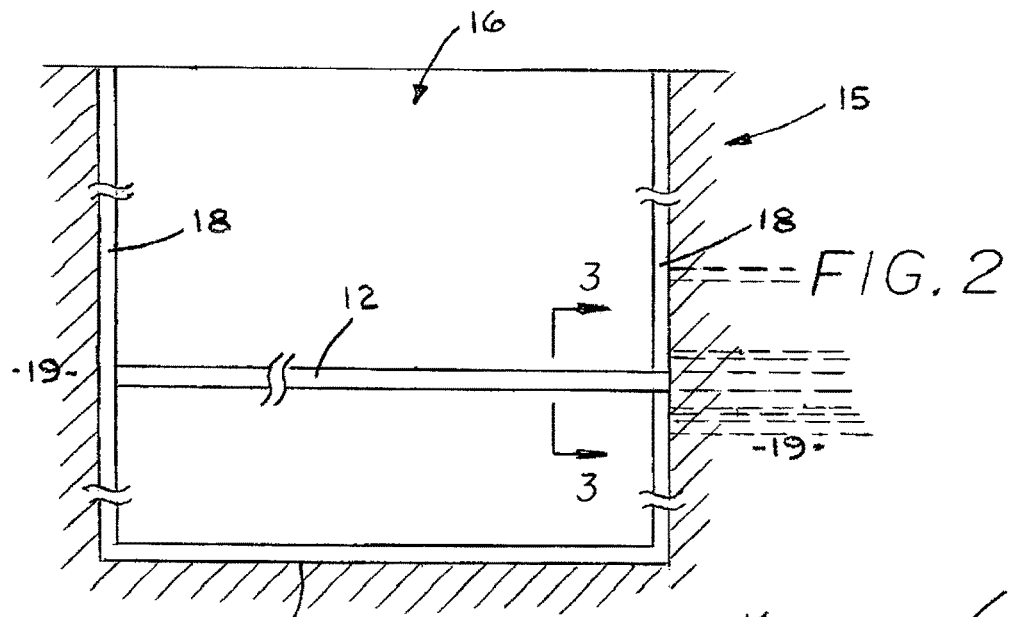
FIG. 2 is a somewhat schematic, fragmented, sectional view of a typical manhole with a cable extending therethrough.
Figure 3:
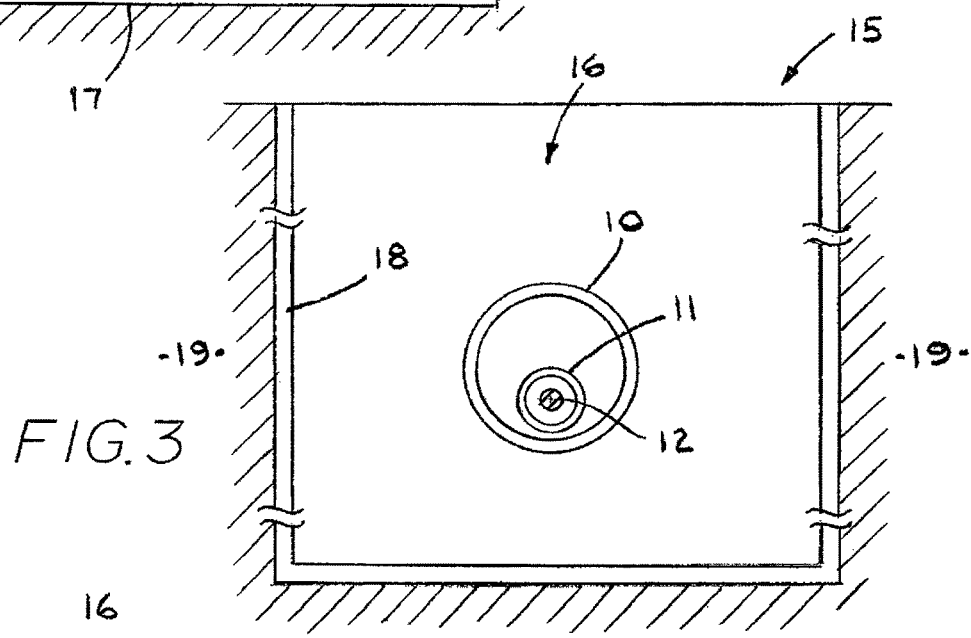
FIG. 3 is a sectional view taken substantially along line 3-3 of FIG. 2 and showing an end wall of the manhole.

FIG. 2 schematically depicts a conventional cable service point such as a manhole generally indicated by the numeral 15. Manhole 15, of course, has a normally covered open top 16, a bottom surface 17 on which workers may stand, and sidewalls 18. When conduits are initially inserted in the ground 19, manholes 15 are provided every several hundred feet for access to the cables 12 (one shown in FIG. 2 for convenience) which extend across the manhole 15 from one sidewall 18 to the other sidewall 18. The cable 12 shown in FIG. 2 is fragmented to indicate that the cable 12 does not pass through the manhole 15 from one sidewall 18 to the other. Rather, typically, a coil of cable 12 may be found in a manhole 15. As shown in FIG. 3, the conduit 10 and innerducts 11 (one shown in FIG. 3 for convenience) are exposed in manhole sidewalls 18.

Figure 4:
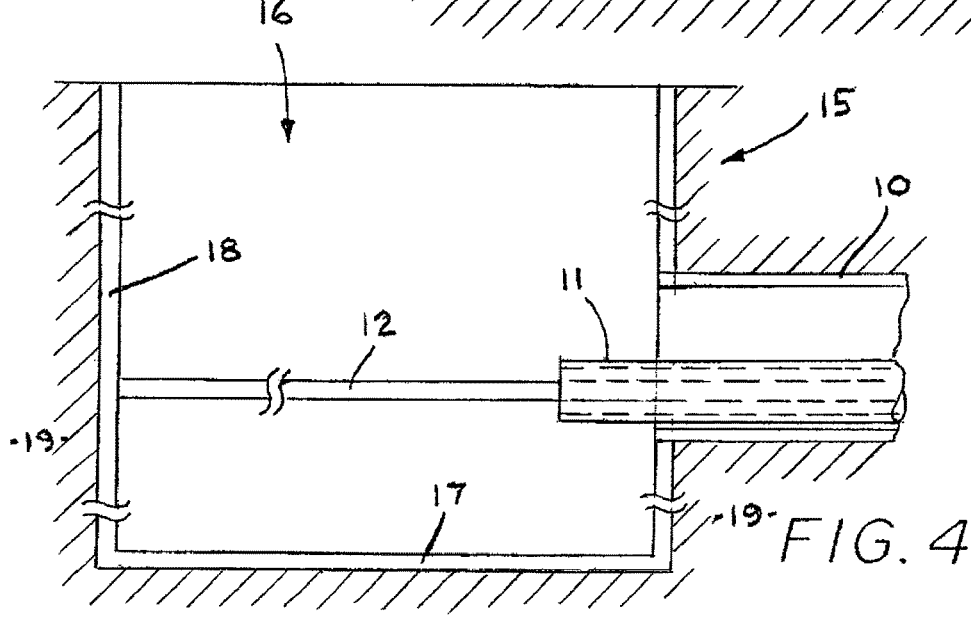
FIG. 4 is a schematic view like FIG. 2 showing a portion of an innerduct having been removed from the conduit.

The operation of the system of the present invention can take place in a manhole 15, and in accordance with an embodiment of the present invention, the innerduct 11 to be operated upon can be pulled a short distance into the manhole as shown in FIG. 4. Then an assembly, generally shown in FIG. 5, can be used to remove and cut innerduct 11 as now will be described.

Figure 5:
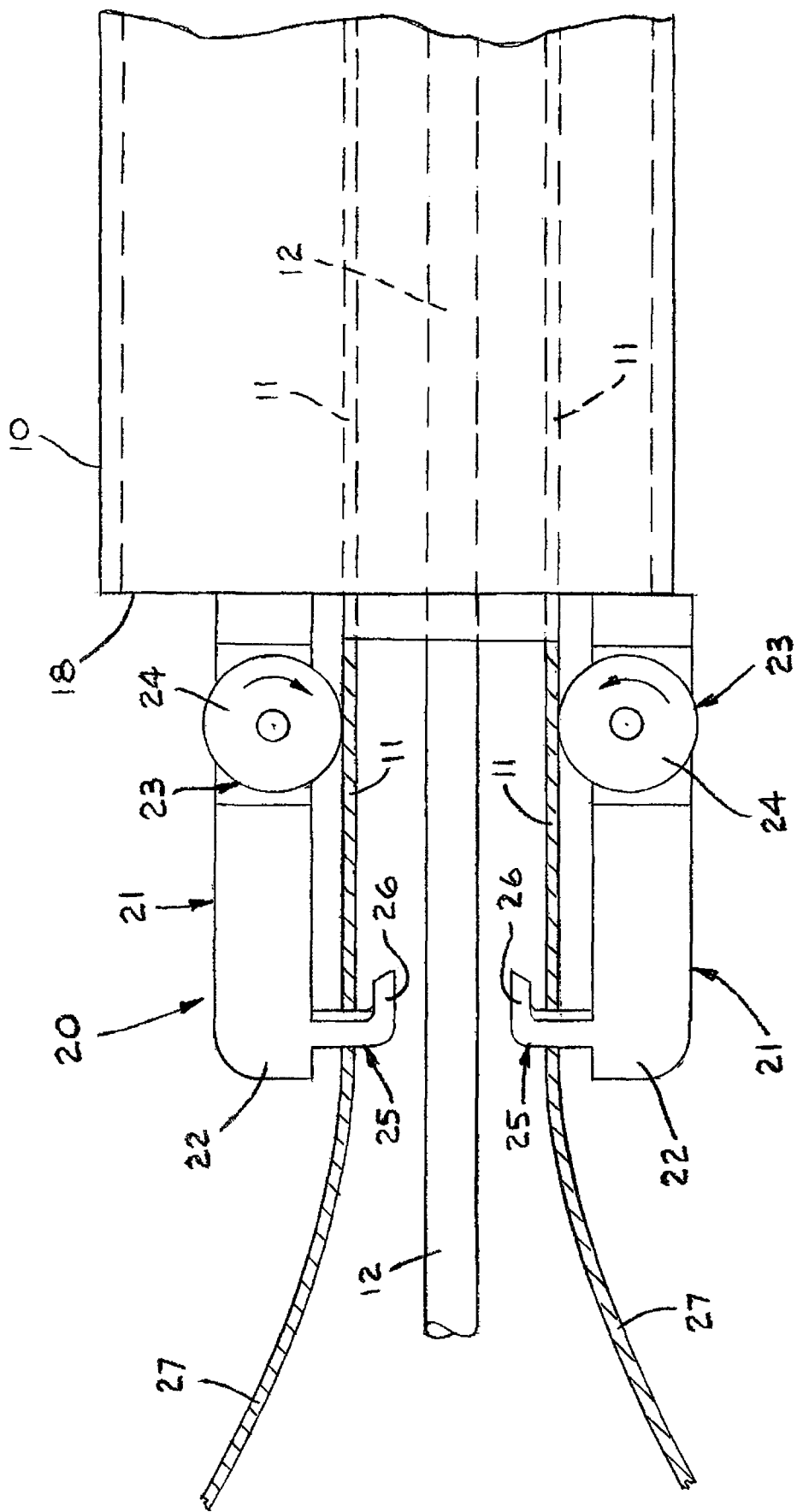
FIG. 5 is a schematic top representation of a device positioned in the manhole which cuts and removes the innerduct from the conduit according to one aspect of the present invention.

Assembly 20 is shown as having a frame generally indicated by the numeral 21. Frame 21 includes spaced support arms 22 the edges of which rest against manhole sidewall 18. Arms 22 are spaced from each other with cable 12 being positioned therebetween. Each arm 22 carries a drive device generally indicated by the numeral 23. Drive 23 can be as shown in the form of rotating wheels 24 or could be in the form of a conventional tractor drive. In the form shown, wheels 24 first clamp down on opposite sides of the exposed innerduct 11, as is shown in FIG. 5, and then wheels 24 may be rotated in opposite directions, as shown by the arrows in FIG. 5, to pull innerduct 11 out of the conduit 10 and move it to the left in FIG. 5. Wheels 24 may be hydraulically driven and may be provided with a knurled surface to assist in the engaging and pulling functions. Since frame 21 is braced against manhole sidewall 18, the force used in the pulling process is borne by sidewall 18.

Each arm 22 of frame 21 also includes a cutting device generally indicated by the numeral 25. In the embodiment shown in FIG. 5, cutting device 25 is schematically shown to be in the form of a stationary blade 26. Opposed blades 26 extend inwardly from each arm 22 a sufficient extent so as to come into contact with innerduct 11 but not so far as to touch and potentially damage active cable 12. Thus, as drive 23 moves innerduct 11 past cutting device 25, innerduct 11 is longitudinally severed at two circumferentially spaced locations and the cut pieces 27 of innerduct 11 may be removed from around cable. If desired to cut innerduct 11 in three or more locations, additional cutting devices 25 can be provided. Pieces 27 may then be ground up and environmentally recycled.

Figure 6:
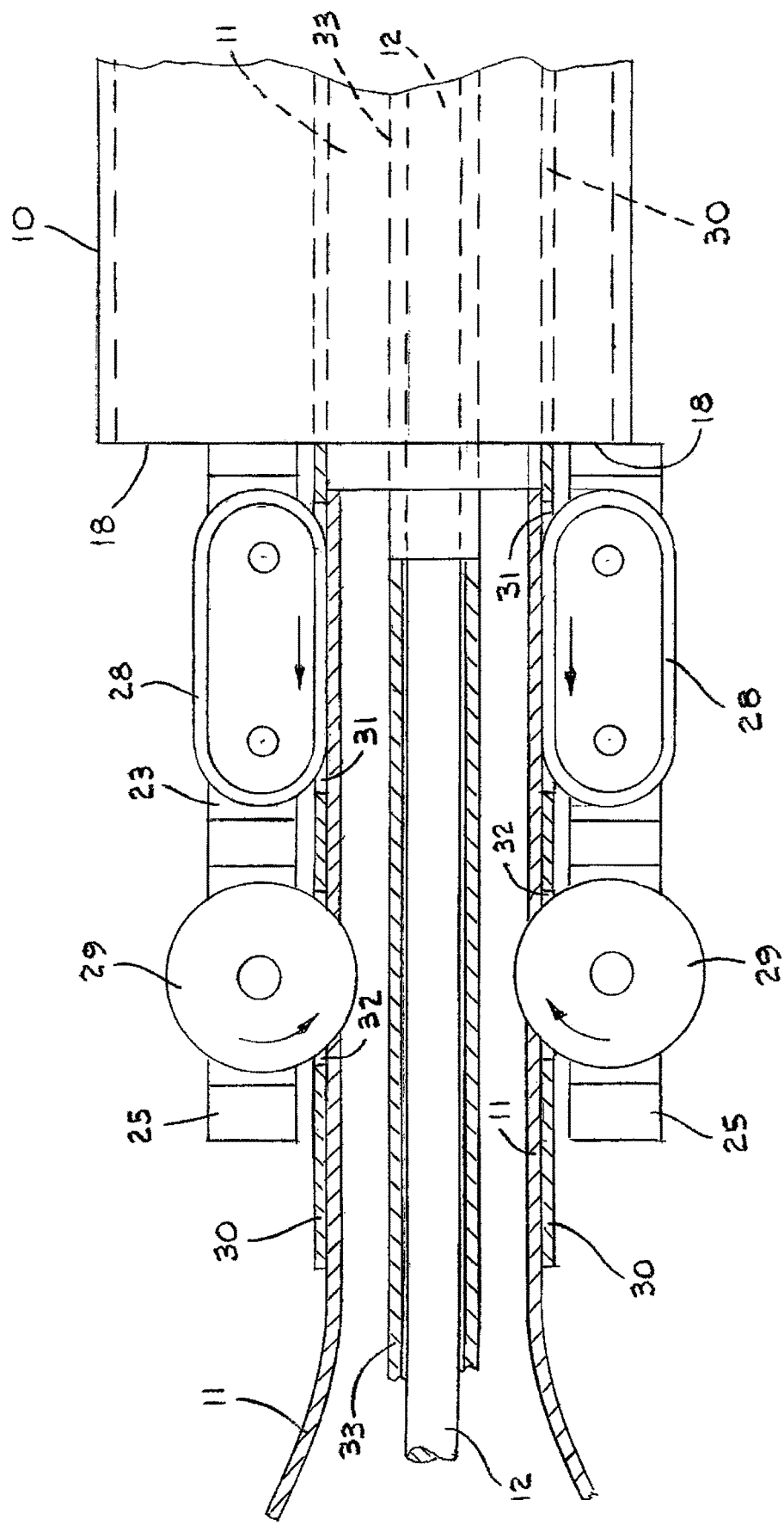
FIG. 6 is a schematic representation similar to FIG. 5 showing some alternative features of the present invention.

FIG. 6 depicts some alternative features to the embodiment of FIG. 5 just discussed. Thus, as shown in FIG. 6, the drive device 23 is shown in the form of conventional tractor devices 28 and the cutting device 25 is shown in the form of rotating cutter wheels 29. Cutter wheels 29 can rotate in a clockwise direction against the direction of movement of the innerduct 11 or, if desired, could rotate in a counterclockwise direction to actually assist tractor devices 28 in the movement of innerduct 11.

FIG. 6 also shows that if desired, a split metal tube 30 can be inserted into the conduit 10 and around innerduct 11 if guidance of the innerduct 11 is required as it is being removed from the conduit 11. Tube 30 extends out of the conduit and into manhole 15 and is shown as having a slot 31 at the location of drive devices 23 so that they may engage the innerduct 11 and other slot 32 at the location of cutting devices 25 to that they may longitudinally sever the innerduct 11. Moreover, if necessary to protect the live cable 12 from damage which might be occasioned by accidental contact with the cutting devices 25, a split metal tube 33 may be inserted a short distance into conduit 10 around cable 12. Tube 33 extends into manhole 15 to 50 protect cable 12, if necessary.

Figure 7:
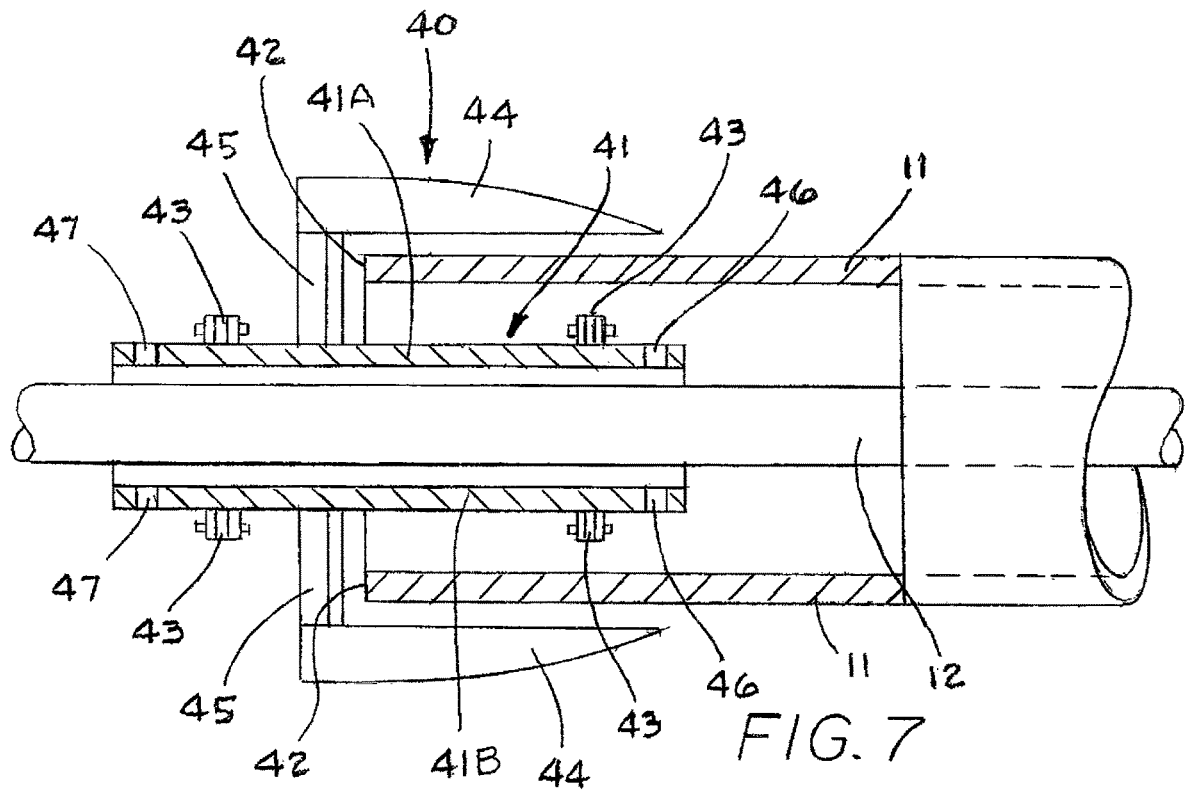
FIG. 7 is a somewhat schematic depiction of an alternate system to cut and remove innerduct from the conduit.
Figure 8:
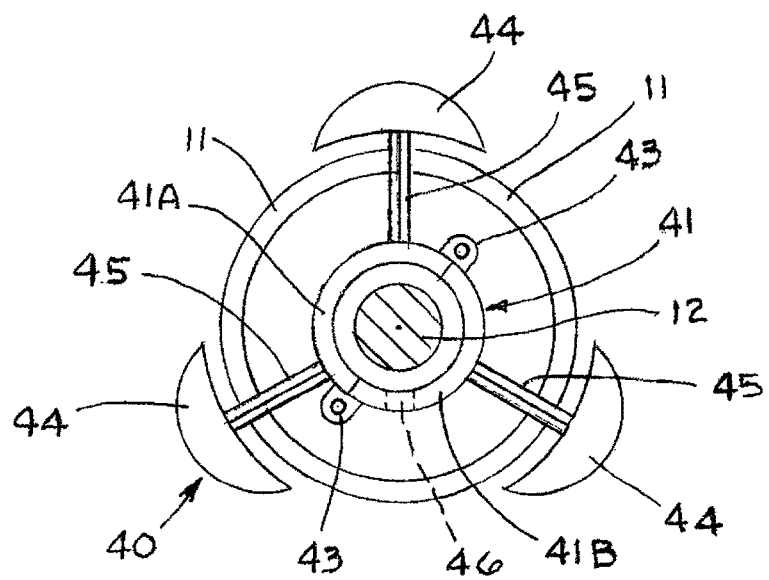
FIG. 8 is an end view of the device of FIG. 7.

FIGS. 7 and 8 show an alternative system to accomplish space recovery in a conduit. There, a cutting assembly, generally indicated by the numeral 40, includes a body portion generally indicated by the numeral 41. Body portion 41 must extend around the cable 12, but because live cables cannot be severed, body portion 41 is split into two sections 41A and 41B. Body portion 41 is installed around a cable 12 at a service point, such as the manhole previously described, where the cable 12 is exposed. The innerduct having an edge 42 may then be pulled into the manhole and the two halves can then be positioned around the cable 12 and can be connected by any suitable means. For example, each half 41A, 41B may be provided with a small apertured flange 43 which mate with each other and receive a fastener.

Cutting assembly 40 includes a plurality of outer guides 44 which are positioned on the circumferential outside of the innerduct 11 being worked on. A blade 45 extends from each guide 44 to body portion 41. Blades may be attached to guide 44 and/or body portion 41 in such a manner that they could be readily changed, if necessary. While three blades 45 are shown, which will longitudinally slit innerduct 11 into three pieces, as is evident from the previous discussion of FIGS. 5 and 6, at least two blades 45 are required. Moreover, more than three blades 45 could be utilized if desired. At the outset of the cutting process, blades 45 are positioned adjacent to end 42 of innerduct 11.

Blades 45 longitudinally slit innerduct 11 by causing relative movement between cutting assembly 40 and innerduct 11. This can happen by causing cutting assembly 40 to remain stationary and pulling innerduct 11 past blades 45 (to the left in FIG. 2) in a similar manner as described with respect to FIGS. 5 and 6. Or cutting assembly 40 can be caused to move through the conduit 10. Such can be accomplished by blowing one or more pull tapes into the conduit 10 in a conventional manner. Then the tape(s) can be attached to the cutting assembly 40. To that end, body sections 41A and 41B may be provided with slots 46 so that the pull tape can be connected thereto. Then by pulling on the tape, downstream from the end 42 of innerduct (at the next adjacent manhole), cutting assembly 40 can move, to the right in FIG. 2, through conduit 10 to cut innerduct 11. Slots 47 are also provided at the other end of cutting assembly 40 so that a tape can be attached thereto to pull cutting assembly 40 in the reverse direction, if necessary.

When the innerduct 11 has been longitudinally split as shown in FIG. 1B, its pieces may be easily pulled out of conduit 10. If additional innerducts 11 are in conduit 10 and if it is desired or necessary to remove them all, the process may be repeated until all innerducts are spliced and removed creating the recovered space 14. As previously described, the pieces of the innerduct may be ground up and environmentally recycled. Once the space of one or more removed ducts has been recovered, the fabric innerduct M such as that shown in U.S. Pat. No. 6,251,201 could be inserted into that space so that one or more new cables could be inserted into the fabric innerduct.

In view of the foregoing, it should be evident that a conduit space recovery system as described herein accomplishes the objects of the present invention and otherwise substantially improves the art.

What is claimed is:

1. A method of recovering space in a longitudinally extending conduit positioned underground and having at least one active cable positioned within a longitudinally extending duct which is in the conduit comprising the steps of using an assembly having a pulling device to move the duct out of the conduit, and having a blade so that as the duct is being moved, the blade simultaneously cuts the duct thereby simultaneously removing the entire duct from around the active cable which remains in the conduit so that when the entire duct is completely removed from the conduit, space is recovered in the conduit.

2. The method of claim 1 wherein the pulling device moves the duct by grasping the duct with opposed wheels, and rotating the wheels to pull the duct out of the conduit.

3. The method of claim 1 wherein the pulling device moves the duct by engaging the duct with opposed tractor drives.

4. The method of claim 1 wherein the assembly cuts the duct by moving the duct past fixed blades.

5. The method of claim 1 wherein the assembly cuts the duct by moving the duct past rotating blades.

6. The method of claim 1 further comprising the step of guiding the duct as the duct is being moved out of the conduit.

7. The method of claim 1 further comprising the step of protecting the cable while cutting the duct.

8. The method of claim 1 further comprising the step of inserting an innerduct in the recovered space.

9. A method of utilizing an assembly having a blade and a pulling device to recover space in a longitudinally extending conduit positioned underground and having at least one active cable positioned within a longitudinally extending duct which is in the conduit comprising the steps of using the assembly to longitudinally cut the duct, while cutting the duct utilizing a split tube to protect the active cable, and using the assembly to remove the duct from around the active cable by pulling the duct entirely out of the conduit thereby recovering space in the conduit while maintaining the active cable in the conduit.

10. The method of claim 9 wherein the using steps are done generally simultaneously.

11. The method of claim 9 wherein the step of using the assembly to cut the duct includes the step of moving the duct past a blade.

12. The method of claim 11 wherein the step of moving includes the step of pulling the duct out of the conduit.

13. The method of claim 9 wherein the step of using the assembly to cut the duct includes the step of moving a blade through the conduit.

14. The method of claim 9 further comprising the step of inserting an innerduct in the recovered space.

15. A method of recovering space in a longitudinally extending conduit positioned underground and accessible in a manhole, the conduit having at least one active cable positioned within a longitudinally extending duct in the conduit comprising the steps of accessing the conduit and the duct in the manhole, pulling the duct a short distance into the manhole, then engaging the duct, utilizing a pulling device to move the engaged duct toward a blade assembly in the manhole, as the duct is being moved simultaneously cutting the duct in the manhole longitudinally into at least two pieces while maintaining the active cable in the conduit, and removing the pieces from around the cable so that when the duct is completely out.

* * * * *